H. M. HOWE.
Apparatus for Cutting Loaf-Sugar.

No. 148,460. Patented March 10, 1874.

Witnesses, Harry Smith
Thomas McIlvain

Herbert M. Howe
by his Attys.
Howson and Son

United States Patent Office.

HERBERT M. HOWE, OF PHILADELPHIA, PENNSYLVANIA.

IMPROVEMENT IN APPARATUS FOR CUTTING LOAF-SUGAR.

Specification forming part of Letters Patent No. 148,460, dated March 10, 1874; application filed February 21, 1874.

*To all whom it may concern:*

Be it known that I, HERBERT M. HOWE, of Philadelphia, Pennsylvania, have invented a Machine for Cutting Loaf-Sugar, of which the following is a specification:

The object of my invention is to rapidly and effectually reduce bars and slabs of white sugar to cubical blocks by mechanism which I will now proceed to describe, reference being had to the accompanying drawing, in which—

Figure 1:
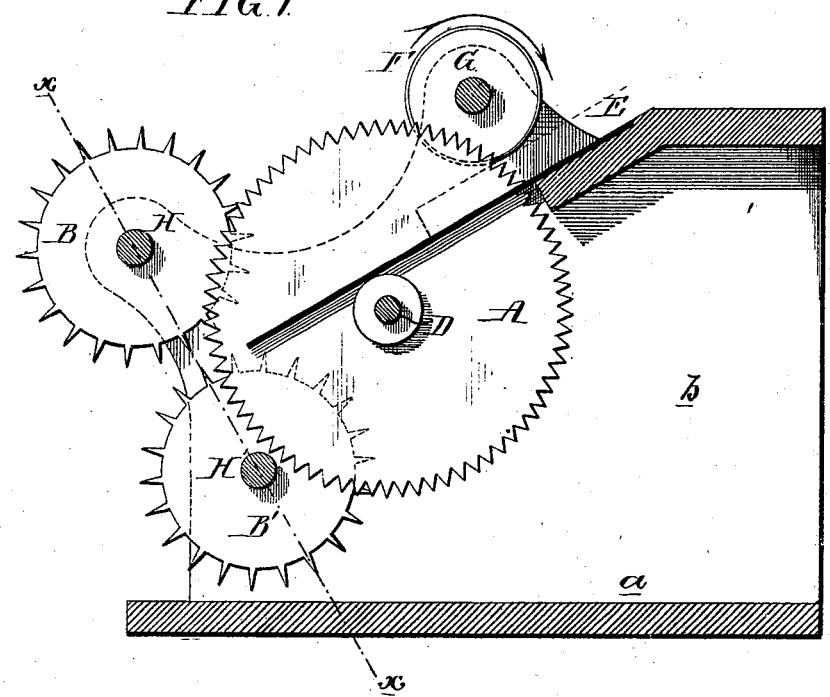
Figure 2:
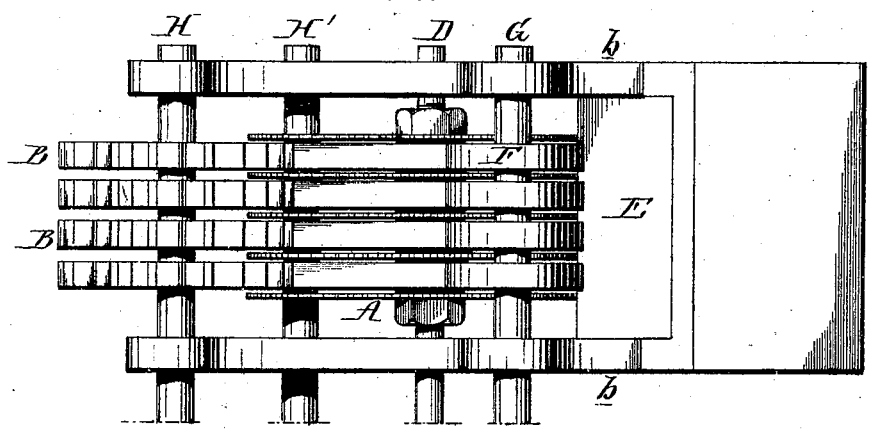

Figure 1 is a vertical section, and Fig. 2 a plan view, of the machine.

The frame-work, which admits of many different styles of construction, consists, in the present instance, of a base, $a$, and two side standards, $b\ b$, in which the different shafts, referred to hereafter, revolve. The shaft D carries a gang of circular saws, A, arranged sufficiently far apart from each other to cut a slab of sugar into bars of the desired width. E is an inclined platform, secured to the frame, slotted to receive the saws, and forming the bed on which the sugar is placed, and down which it is fed by disks F, carried by a shaft, G, a portion of each disk projecting between two adjoining saws throughout the set. The periphery of each disk should consist of a rubber band, bearing with a yielding pressure on the slab of sugar. The fracturing-disks B are secured to a shaft, H, and similar disks B′ to a shaft, H′, and each disk of each set is provided with sharp chisel-edged teeth, sufficiently far apart to break the bars into pieces of a length equal, or nearly so, to their width and thickness, and the two sets of disks are so geared together that when the edge of a tooth of a disk of one set coincides with a line, $x\ x$, drawn through the centers of the two shafts H H′, the edge of a tooth of the opposite disk of the other set must coincide with the same line. Simultaneous action of the teeth, on opposite sides of each bar at directly opposite points, is thus insured, and accuracy of fracture attained.

The slab of sugar having been placed on the inclined plane E beneath the feeding-disks F, the latter will gradually draw the slab downward and subject it to the action of the saws, which must sever the slabs into bars. As these bars descend the inclined plane the saws themselves serve to guide them in their proper course and present them in the proper position to the fracturing-disks, the teeth of which, in fact, seize the bars before they have left the lateral control of the saw-blades, and the fracture of a cube from each bar takes place at a point near the toothed periphery of the saw.

It will be observed that portions of the fracturing-disks of each set project between the saws in order that the bars may not cease to be properly guided by the blades until the moment the severing action of the said disks takes place.

It has not been deemed necessary to illustrate or describe the gearing and driving appliances used in connection with the machine, as the requirements of the latter in this respect will be readily understood without explanation.

I claim as my invention—

The combination of the slotted inclined plane E, the gang of circular saws A, and the two sets of fracturing-disks B and B′ projecting between the saws, all as set forth.

In testimony whereof I have signed my name to this specification in the presence of two subscribing witnesses.

H. M. HOWE.

Witnesses:
WM. A. STEEL,
HARRY SMITH.